United States Patent [19]

Bowler et al.

[11] Patent Number: 5,735,385
[45] Date of Patent: Apr. 7, 1998

[54] CONVEYOR BELT SCRAPERS

[76] Inventors: Alan Bowler, 164 Barrs Road, Cradley Heath, Warley, West Midlands B64 7EX, England; John Anthony Brumby, 1 Quay Street, Lostwithiel, Cornwall, PL22 0B5, Great Britain

[21] Appl. No.: 814,354

[22] Filed: Mar. 11, 1997

[30] Foreign Application Priority Data

Mar. 16, 1996 [GB] United Kingdom ............... 9605591

[51] Int. Cl.$^6$ .................................................. B65G 45/16
[52] U.S. Cl. ............................................. 198/499; 198/497
[58] Field of Search ........................................ 198/497, 499

[56] References Cited

U.S. PATENT DOCUMENTS

| | | | |
|---|---|---|---|
| 4,696,388 | 9/1987 | Stoll | 198/499 X |
| 4,927,003 | 5/1990 | Swinderman et al. | 198/497 |
| 5,344,000 | 9/1994 | Gleason | 198/499 |

FOREIGN PATENT DOCUMENTS

| | | | |
|---|---|---|---|
| 3742583 | 5/1989 | Germany | 198/499 |
| 0077017 | 5/1985 | Japan | 198/499 |
| 0291316 | 12/1986 | Japan | 198/497 |
| 4182212 | 6/1992 | Japan | 198/499 |

*Primary Examiner*—James R. Bidwell
*Attorney, Agent, or Firm*—Schweitzer Cornman Gross & Bondell LLP

[57] ABSTRACT

A conveyor belt scraper in which a row of scraping blades 38 is held clamped between upper flanges 30,30' of a resilient buffer 28,28'. Lower flanges 32,32' of the buffer are secured to opposite sides of a flange 40 of a supporting beam 42. Bowed side walls 34,34' of the buffer, extending between the lower flanges and the upper flanges, form a hollow structure housing the beam 42. The hollow structure is oversize compared with the beam cross-section so as to leave clearance space 46 between upper surfaces of the beam and upper portions of the buffer. The buffer components are moulded of rubber and some movement of the resiliently-supported blades, in a direction toward and away from the conveyor belt, is permitted by compression of the hollow structure into the clearance space 46.

5 Claims, 3 Drawing Sheets

CONVEYOR BELT SCRAPERS

This invention is concerned with improvements in or relating to belt scrapers of a kind suitable for use in scraping the working surfaces of continuous conveyor belts, to remove material which remains adhered to the belt after the belt has deposited a load. The belt surface is so continuously cleaned for re-use. Such scrapers are commonly used on conveyor belts employed in the quarrying and mining industries.

It is common practice to provide a first scraper (usually referred to as a primary scraper) to act against the belt at a position below the level of an outward belt run where the belt is supported by a head pulley between its outward and return runs. The primary scraper ordinarily comprises a scraping blade which extends across the width of the belt, the blade lying at a sharp acute angle to the belt surface.

A second scraper (usually referred to as a secondary scraper) is commonly provided to act against the belt at a position immediately after the belt has left the surface of the head pulley in commencing its return run. The secondary scraper ordinarily comprises a scraping blade which extends across the width of the belt and stands substantially perpendicularly to the belt surface.

One known form of scraper, suitable for use as a secondary scraper, comprises a beam which is arranged to extend transversely of the conveyor belt run and supports a row of blade-carrying mountings moulded of rubber; the shock-absorbing rubber mountings are commonly referred to as buffers. Individual scraping blades are held by the row of buffers to form a substantially continuous blade edge which may, for example, be of tungsten carbide; the actual material providing the blade edge is selected according to the duties it must perform, some blades being of rigid polyurethane. In one known arrangement a buffer comprises lower and upper bifurcated portions embracing, respectively, an upwardly projecting flange of the beam and a lower portion of the blade. A middle portion of the buffer provides effectively a stiff hinge between the upper and lower portions, whereby to provide some resiliency in the mounting for deflection of the blade edge in the direction of the belt path (i.e. laterally of the blade).

Whilst such buffer-type blade mountings have the merits of providing rugged and highly effective scrapers, problems arise from blade wear. It is quite usual for there to be more material adhered to central portions of a conveyor belt than to peripheral regions, and as a consequence wear of the scraping blades tends to be greater towards the middle of the scraper than towards its ends. The construction of the total blade edge from a plurality of individually mounted blades enables individual blades to be changed as necessary, but such maintenance work is undesirable and can interrupt production.

It is an object of the present invention to reduce problems of blade wear in conveyor belt scrapers which utilise buffer-type blade mountings, and generally to provide an improved design of buffer.

The invention provides, in one of its aspects, a conveyor belt scraper comprising a scraping blade, a blade-holding buffer arranged to hold a blade in engagement with a conveyor belt, and means supporting the buffer, the buffer being resiliently compressible in the direction towards and away from the belt.

Conventional buffers are effectively inflexible in the direction towards and away from the belt and can therefore provide no compensation for blade wear. A resiliently flexible buffer in accordance with the invention, in permitting some movement of the blade, can compensate for blade wear, in particular where the blade is, in the conventional manner, but one of a plurality of such blades extending in a line forming a blade edge reaching across the width of the belt.

There now follows a description, to be read with reference to the accompanying drawings, of a conveyor belt scraper which illustrates the invention by way of example.

In the accompanying drawings:

FIG. 4 is a plan view of an end portion of the beam shown in FIG. 3.

Figure 1:
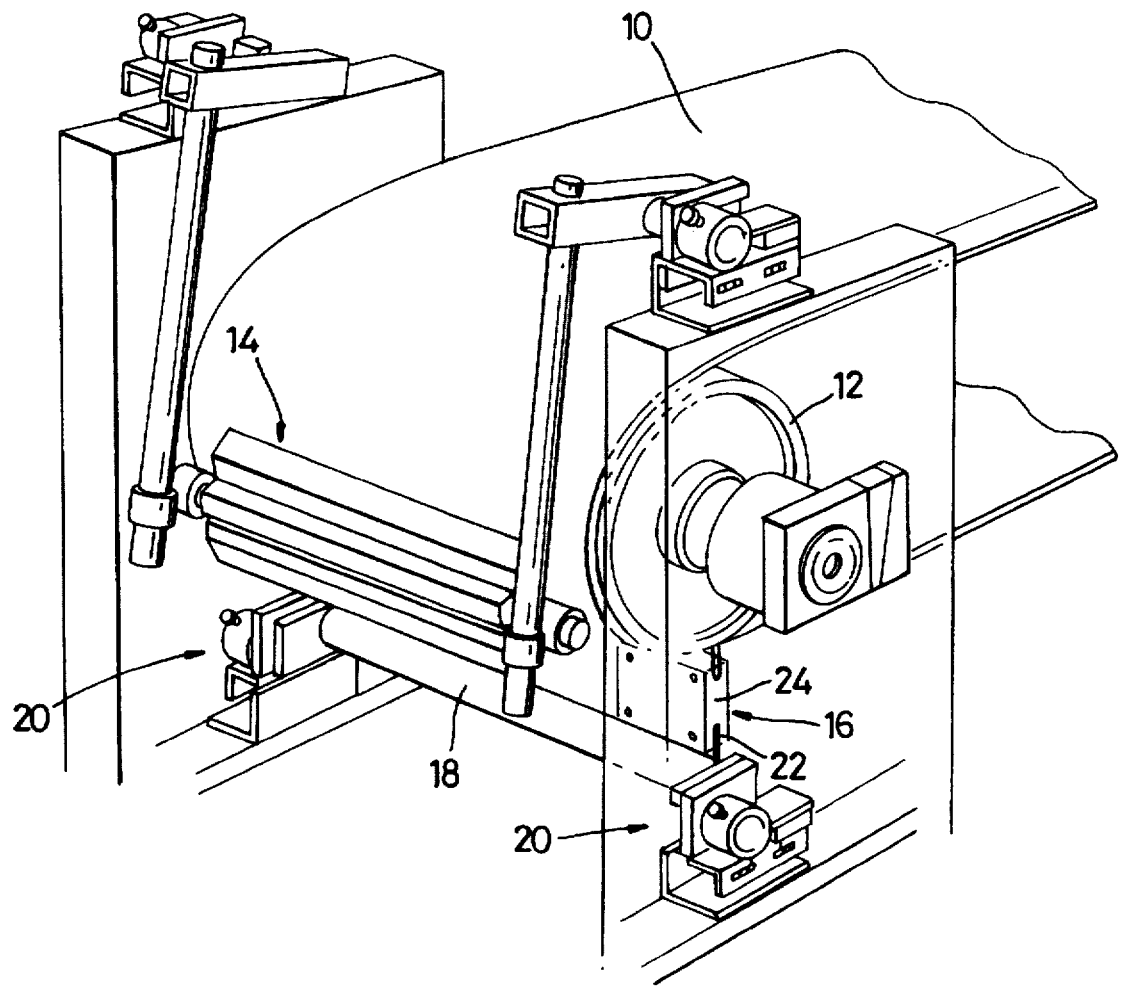
FIG. 1 is a perspective view of a conveyor belt installation, at a head pulley of the installation, utilising prior art primary and secondary scrapers.

As shown in FIG. 1 in relation to prior art, a conveyor belt installation suitable for use in the mining and quarrying industries comprises a continuous belt 10 which runs around a head pulley 12 at the end of a load-carrying outward run of the belt. Two scrapers, a primary scraper 14 and a secondary scraper 16, are positioned to scrape the working surface of the belt in the vicinity of the head pulley.

The secondary scraper 16 comprises a stiff tube forming a beam 18 which extends across the width of the belt, generally beneath the head pulley 10. The beam is supported adjacent to each end on height-adjustable mountings 20 which enable the beam to be raised and lowered, for accurate positioning of the beam. A vertical flange 22 projects upwards from the beam, along most of the length of the beam between the beam mountings 20, for the retention of moulded rubber blade-holding buffers 24; bifurcated lower portions of the buffers embrace the flange and are bolted to it. Bifurcated upper portions of the buffers embrace and are bolted to lower portions of tungsten carbide-tipped blades which engage the belt surface. The scraper is positioned to engage the belt, perpendicularly to the belt surface, immediately after the belt has left the surface of the head pulley on its return run.

Figure 2:
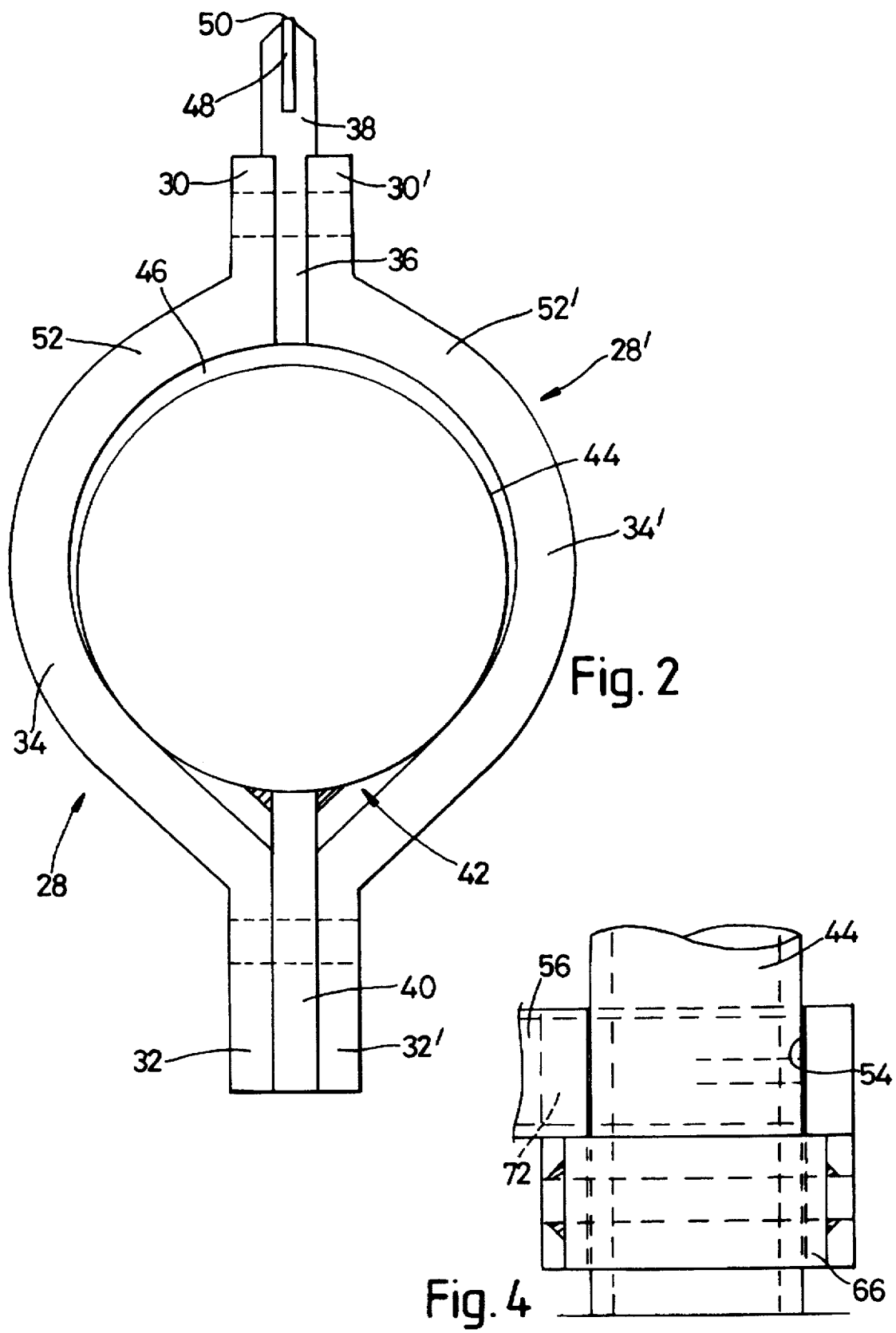
FIG. 2 is a cross-section taken through a scraper according to the invention.

In a secondary scraper according to the invention, a buffer structure (FIG. 2) is formed from two identical elements 28, 28' of moulded rubber. Each element comprises an upper flange 30, 30', a lower flange 32, 32' and a bowed wall 34, 34' interconnecting the flanges.

The two upper flanges 30, 30' are adapted to be bolted together with a plate-like lower portion 36 of a scraping blade 38 sandwiched between them, so to hold the blade securely.

The two lower flanges 32, 32' are adapted to be bolted together with a flange 40 of a supporting beam 42 sandwiched between them. The flange is welded to an underside of a stiff beam tube 44, the flange being perpendicular to the tube; the flange so lies in the same plane as the lower portion 36 of the scraping blade. The two bowed walls 34, 34' form a compressible hollow structure surrounding the beam. The structure is secured to the beam at the flange 40 beneath the tube 44 but is oversize compared with the beam cross-section, so to leave a clearance space 46 between upper surfaces of the beam and upper portions of the buffer.

The blade 38 comprises a plate-like steel body forming the lower portion 36 gripped by the buffer and being a holder for a tungsten carbide plate 48 received into a slot in the body and forming a scraping edge 50. The blade 38 and the beam flange 40 lie in a common axial plane of the beam tube 44.

In use of the scraper, the buffer permits the blade to move a little towards and away from the belt in the plane and the blade, the blade being constantly urged into engagement with the belt by the resilient buffer. Upper portions 52, 52' of the buffer walls 34, 34' form resiliently deflectable blade-supporting limbs which are spaced apart laterally to opposite sides of the blade, the buffer structure being bisected by the plane of the blade.

The scraper comprises a plurality of buffer-mounted blades in a row along the beam 42. To allow for greater wear of blades positioned towards the centre of the scraper than those towards the ends, two or more grades of blade may be used in making up the scraper. For example, wider blades or blades of harder material could be used towards the centre of the scraper. (This concept could also be applied to prior art scrapers). For ease of identification, for maintenance purposes and otherwise, different grades of blade could be identified by color or other distinctive markings.

Figure 3:
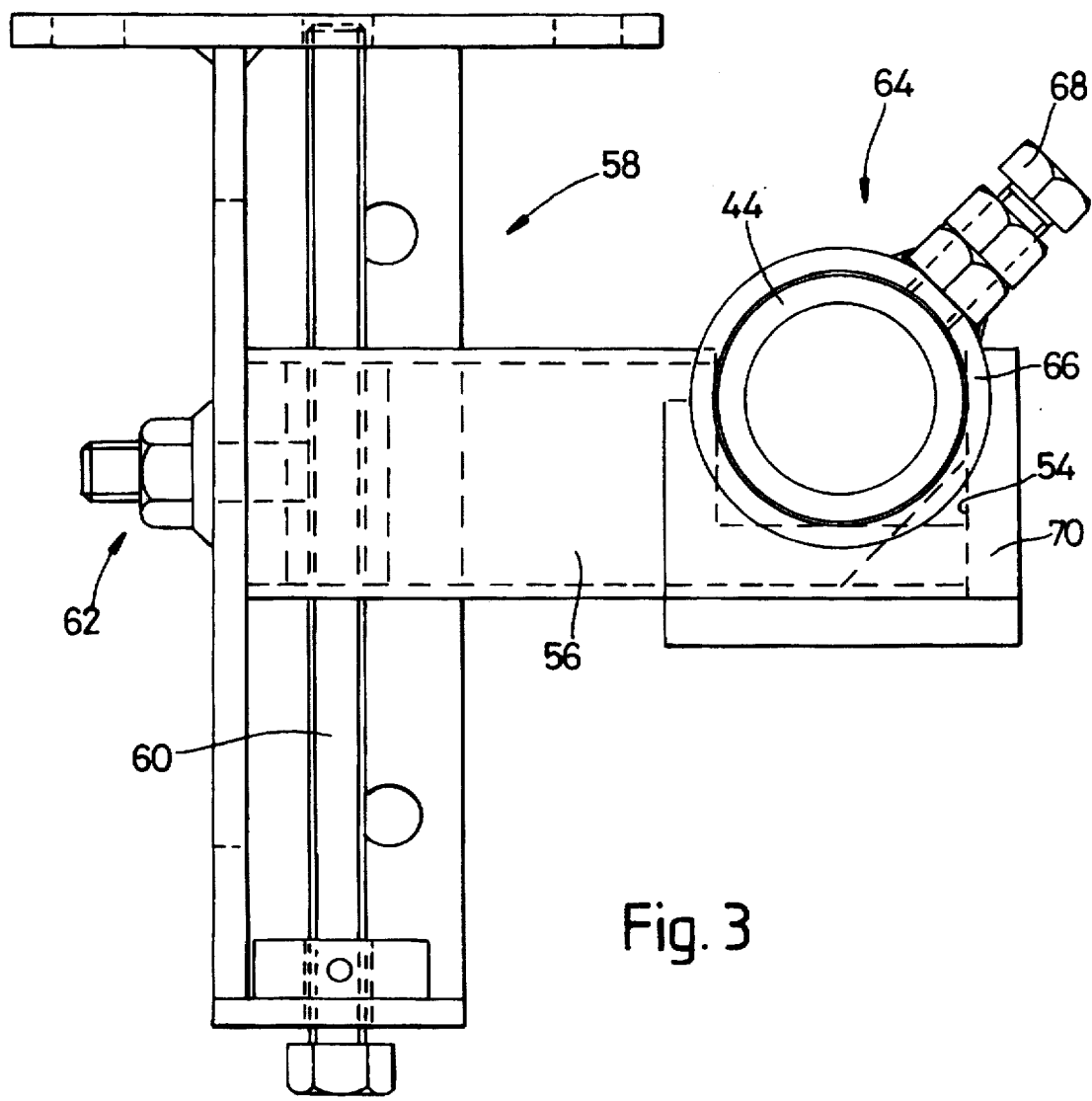
FIG. 3 is a view in elevation of beam-mounting structure of the scraper according to the invention.

Opposite end portions of the beam tube 44 (FIGS. 3 and 4) are supported in cradles 54 formed in height-adjustable mountings 58 for the beam; the height of the beam can be adjusted at each end by means of a lead screw 60 and locked in adjusted portion by means of a stud and nut arrangement 62.

The beam tube is held down in the cradle 54 at each end by means of a clamping device 64. The device comprises a collar 66, which is slipped over the end of the tube and moved up to the cradle arm 56, and a locking screw 68 which extends radially through the collar to abut the tube, and so clamp the tube within the collar when tightened. An angle plate 70 welded to the collar 66 comprises a flange 72 which extends beneath the cradle arm 56 to abut an undersurface of the arm and prevent lifting of the device relative to the arm.

For removal of the beam, the locking screws 68 are released at each end of the beam, the clamping devices slipped back to withdraw their flanges from beneath the cradle arms, and the beam can then be lifted out of the two cradles 54 supporting it.

We claim:

1. A conveyor belt scraper comprising a scraping blade, a blade-holding buffer and means supporting said buffer, said buffer being arranged to hold said blade in engagement with a conveyor belt and being resiliently compressible in the direction towards and away from the belt, said buffer-supporting means comprising a beam and said buffer comprising a hollow structure which surrounds said beam, said buffer being secured to said beam on the opposite side of said beam from said blade but being clear of surfaces on the same side of said beam as the blade to permit compressive deflection of the structure, portions of opposite side walls of said hollow structure providing laterally-extending blade-supporting limbs which are spaced apart to opposite sides of the blade and comprise bodies of elastomeric material whereby the limbs can bend under load from the blade.

2. A conveyor belt scraper according to claim 1 wherein the buffer comprises two bodies of bowed form and of elastomeric material providing said hollow structure.

3. A conveyor belt scraper according to claim 2 wherein said two bodies are secured together and to the blade on one side of the beam and are secured together and to the beam on the opposite side of the beam from the blade.

4. A conveyor belt scraper according to claim 2 wherein flange-forming portions of the two bodies are secured together with a flange of the beam sandwiched between them.

5. A conveyor belt scraper according to claim 2 wherein flange-forming portions of the two bodies are secured together with a plate-like portion of the scraping blade sandwiched between them.

* * * * *

UNITED STATES PATENT AND TRADEMARK OFFICE
CERTIFICATE OF CORRECTION

PATENT NO. : 5,735,385
DATED : April 7, 1998
INVENTOR(S) : Bowler, et al

It is certified that error appears in the above-identified patent and that said Letters Patent is hereby corrected as shown below:

On the title page: Item [73] insert the following:

Horizon (GB) Limited

West Midlands
Great Britain

Signed and Sealed this

Fourteenth Day of September, 1999

Attest:

Q. TODD DICKINSON

*Attesting Officer*  *Acting Commissioner of Patents and Trademarks*